Aug. 14, 1956 J. H. LONG 2,759,043

AUTOMATIC START-STOP MEANS WITH DELAYED TIMING CYCLE

Filed May 25, 1951 3 Sheets-Sheet 1

INVENTOR.
JOHN H. LONG

BY Carl V. Olson

ATTORNEY

AUTOMATIC START-STOP MEANS WITH DELAYED TIMING CYCLE

Filed May 25, 1951 3 Sheets-Sheet 2

INVENTOR.
JOHN H. LONG
BY
Carl V. Olson
ATTORNEY

Aug. 14, 1956 J. H. LONG 2,759,043

AUTOMATIC START-STOP MEANS WITH DELAYED TIMING CYCLE

Filed May 25, 1951 3 Sheets-Sheet 3

*INVENTOR.*
JOHN H. LONG

*BY* Carl V. Olson

*ATTORNEY*

2,759,043

AUTOMATIC START-STOP MEANS WITH DELAYED TIMING CYCLE

John H. Long, Flushing, N. Y., assignor to Faximile, Inc., New York, N. Y., a corporation of Delaware Application May 25, 1951, Serial No. 228,310
7 Claims. (Cl. 178—6.6)

This invention relates to facsimile systems and more particularly to facsimile recorders having automatic means for starting, delayed stopping, and phasing responsively to a standard facsimile signal.

A most successful facsimile system for the transmission of graphic material by radio or wire includes a recorder wherein a strip of electrolytic paper is continuously passed between linear and helical electrodes having a point of intersection which moves in one direction across the paper to trace succeeding lines thereon. The fluctuating current flowing through the paper point-by-point and line-by-line reproduces the graphic material scanned at sending end of the system. In radio facsimile it is standard to transmit an interpage signal after each page of graphic material. The interpage signal appears at the receiver as a black bar across the recording paper and may include a limited amount of station identification printing or other indicia in reverse. The interpage signal provides a number of consecutive lines of full-black signal for phasing purposes at the recorder, i. e., to insure that the recorded material will be centered on the recording sheet.

In the operation of facsimile systems of the type under discussion, there are many occasions when it is desirable to have a facsimile receiver alert to facsimile signals that may be received, but not in full operation unless signals are actually being received. The strictly recording portion of the receiver should not operate in the absence of a facsimile signal for reasons of recording paper and electric current economy. It is therefore the general object of this invention to provide means responsive to standard facsimile signals for starting the recorder portion of a facsimile receiver upon receipt of a facsimile signal and for stopping the recorder at a predetermined time after the discontinuance of a facsimile signal.

It is another object to provide recorder starting and stopping means which is operative automatically without the need for human attention.

It is a further object to provide a facsimile start-stop apparatus which is more reliable in operation than those previously known.

It is a further object to provide means for automatically stopping a facsimile recorder a predetermined time after the discontinuance of the facsimile signals to insure that the last received page of graphic material will be properly displayed for observation.

It is a further object to provide automatic phasing means operative cooperatively with said start-stop means to preclude improper functioning of the phasing means due to static and interference.

Pursuant to these and other objects which will be apparent to those skilled in the art, a portion of the received facsimile signal is applied to the control electrode of a thyratron having an A.-C. plate voltage supply to insure quenching of the tube in the absence of full-black signal. A special resettable time delay relay is responsive electrically to firing of the thyratron during receipt of a full-black signal, and is responsive mechanically to a convenient driven part of the recorder. Contacts of the special relay control circuits which turn the recorder driving motor on for a predetermined period of time following receipt of a full-black signal, and which intermittently turn off the motor during receipt of a full-black signal until the recorder is in phase.

For a more detailed explanation of the invention reference is had to the following description taken in conjunction with the appended drawings wherein.

Figure 1:
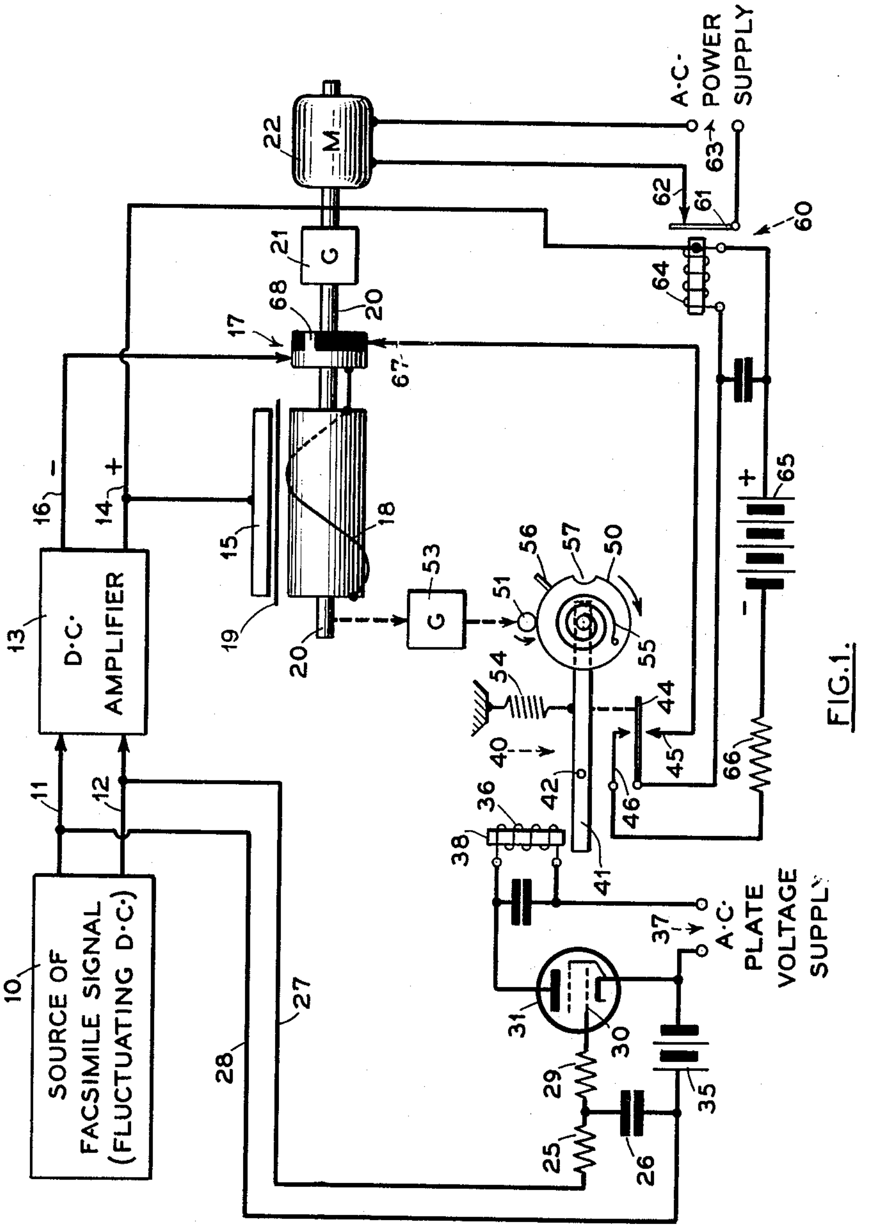
Fig. 1 is a schematic diagram of a presently preferred form of the invention.

Referring now in greater detail to the drawings, the output of a source 10 of facsimile signals, which may be a facsimile radio receiver, is applied by wires 11 and 12 to a D.-C. amplifier 13. The output of the amplifier is applied by wire 14 to linear recording electrode 15, and by wire 16, through the slip ring portion of rotary switch 17, to helical recording electrode 18. Electro-responsive recording paper 19 passes between the recording electrodes and is marked point-by-point and line-by-line to reproduce the graphic copy scanned at the sending end of the system. Helical electrode 18 is rotated by shaft 20 coupled through gears 21 to synchronous motor 22.

Figure 2:
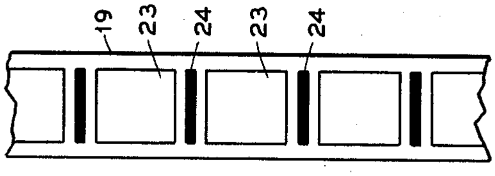
Fig. 2 is a representation of recordings on a continuous strip of recording paper illustrating how pages of graphic material are separated by black bars corresponding to the interpage signals.

The recording paper 19 emerging from between linear and helical electrodes 15, 18 may, as represented in Fig. 2, consist of page portions 23 bearing graphic material, as type, pictures and drawings; the page portions being separated by black bars 24 resulting from the interpage signals received. The bars 24 may contain station identification in reverse printing, which may, for example, be provided by the use at the facsimile transmitter of a device shown and described in U. S. Patent No. 2,483,-442 issued October 4, 1949, to J. W. Smith et al. The control circuits of the present invention are responsive to the full-strength interpage signals.

A high-impedance R-C delay network consisting of resistor 25 and capacitor 26 is connected by wires 27 and 28 to the output of signal source 10. The output of the delay network is connected through resistor 29 to the control electrode 30 of a thyratron tube 31. Resistors 25 and 29 may be 5 megohms in value, and capacitor 26, 0.05 microfarad. Thyratron 31 has a bias voltage source 35 in its grid circuit and a relay magnet coil 36 and A.-C. plate voltage source 37 in its plate circuit. In operation, by reason of the delay network in the input circuit of thyratron 31, the thyratron is rendered conductive only when a full-strength marking signal of appreciable duration is received, as for example, an interpage signal. Thyratron 31 is rendered non-conductive (quenched) upon the termination of the interpage signal by reason of its A.-C. plate voltage source 37 which makes the plate negative once during each cycle.

Figure 3:
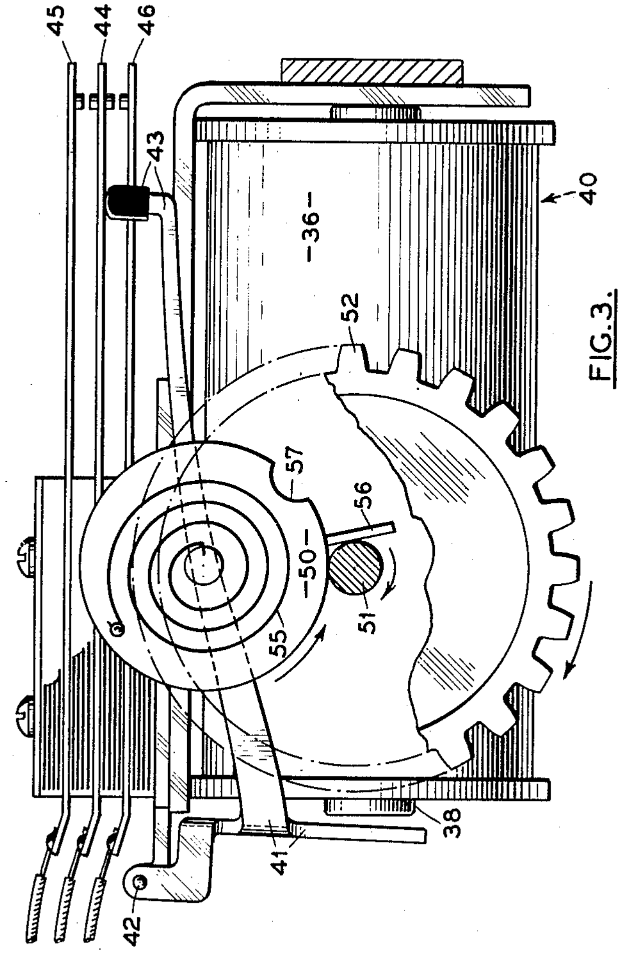
Fig. 3 is a fragmentary view of one form of resettable time delay relay included schematically in Fig. 1.

A special resettable time delay relay generally designated 40 is shown schematically in Fig. 1 and the details of mechanical construction are shown in Fig. 3. Special relay 40 has an operating coil 36 wound on a core 38 of magnetizable material. An armature 41 pivoted at 42 includes a contact-operating arm 43 which acts on movable contact 44 disposed between stationary contacts 45 and 46. A wheel 50, which may be of rubber, is rotatably mounted on armature 41. The periphery of wheel 50 rides on a knurled shaft 51 journaled on a frame (not shown) which is fixed relative to the relay. Knurled shaft 51 is driven by a gear 52 included in gear box 53 which is in turn driven by shaft 20 of the helical electrode or by another convenient rotating shaft in the recorder such as a paper feed roll shaft. In effect, knurled shaft 51 is driven by motor 22. Wheel 50 is biased toward knurled shaft 51 by a spring which is represented by numeral 54 in Fig. 1 and which is integral with spring contact finger 44 in Fig. 3. A spiral spring 55 rotationally biases or tends to rotate wheel 50 to the position shown in Fig. 3 where stop pin 56 on wheel 50 rests against knurled shaft 51. Wheel 50 is provided with a notch 57 which cooperates with the knurled shaft 51 in a manner which will be apparent from the following.

In operation, when coil 36 of relay 40 is energized, armature 41 moves wheel 50 away from contact with knurled shaft 51 and spiral spring 55 rotates wheel 50 in the direction opposite from the arrow until pin 56 rests against knurled shaft 51. At the same time the armature causes contact 44 to touch contact 45. When the relay is deenergized, spring 54 or spring contact 44 acting through armature 41 urges wheel 50 against knurled shaft 51. Then gear 52 and knurled shaft 51 rotate wheel 50 in the direction of the arrow until notch 57 in wheel 50 subtends knurled shaft 51. Spring 54 (Fig. 1) or spring contact 44 (Fig. 3) then is free to urge contact 44 into engagement with contact 46. The cycle of operation repeats when the relay is energized allowing spiral spring 55 to return wheel 50 to the position where stop pin 56 rests against knurled shaft 51. In the cycle of operation described, it will be noted that the armature 41 assumes three distinct operating positions: a first position when the coil 36 is energized to attract the armature and move wheel 50 away from shaft 51 so that wheel 50 assumes its reset position with pin 56 resting on shaft 51, a second position when the spring 54 or spring contact 44 moves the armature to urge wheel 50 against shaft 51, and a third position when notch 57 in wheel 50 subtends shaft 51.

A second relay generally designated 60 includes normally-closed contacts 61 and 62 in circuit with the A.-C. power supply 63 for motor 22. One end of the operating coil 64 of relay 60 is connected to contact 44 of relay 40, and the other end is connected through source of operating potential 65 and current limiting resistor 66 to contact 46 of relay 40. As is apparent, relay 60 is energized from source 65 when contacts 44, 46 of relay 40 are closed.

Relay 60 also may be energized by the signal output from D.-C. amplifier 13, the circuit being from wire 14, through operating coil 64, through contacts 44, 45 of relay 40, through brush 67 and contact segment 68 of rotary switch 17 to output wire 16 of D.-C. amplifier 13. Helical electrode 18 extends less than 360 degrees around the supporting drum. The rotary switch 17 and helical electrode 18 are oriented on shaft 20 so that brush 67 contacts segment 68 during the interval when helical electrode 18 is not under linear electrode 15.

Figure 4:
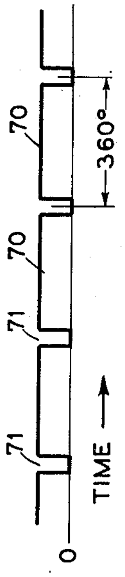
Fig. 4 is a representation of the waveform of an interpage signal.

In operation, the facsimile signal available from source of facsimile signal 10 is such as to record pages 23 of graphic information, each page being separated by a full-black interpage mark 24, as represented in Fig. 2. Interpage mark 24 is recorded when an interpage signal, such as is represented in Fig. 4, is received. The circuits of this invention are operative during receipt of the interpage signal or any equivalent full-black signal. The mode of operation will now be described assuming there is no signal from source 10, contacts 44, 46 of relay 40 are closed by reason of knurled shaft 51 being subtended by notch 57 of wheel 50, and relay 60 is energized from power source 65 thereby disconnecting motor 22 from its source of power 63. This is the condition existing when the mechanical parts of the facsimile receiver are off but the electronic parts are alert to incoming signals.

The first signal received is normally an interpage signal and it is applied through wires 27, 28 to the thyratron, causing it to conduct. The thyratron plate current flows through operating coil 36 of relay 40 with the result that the armature 41 is shifted so that contacts 44, 46 are broken, contacts 44, 45 are closed and wheel 50 is lifted away from knurled shaft 51. Spiral spring 55 returns wheel 50 to the reset position where stop pin 56 bears against knurled shaft 51.

With the breaking of contacts 44, 46, relay 60 is deenergized and its normally-closed contacts 61, 62 close so that power is supplied to motor 22. Motor 22 then drives helical electrode 18 and rotary switch 17 at a speed which (by synchronizing means not shown and not a part of this invention) is synchronous with the received signal at one revolution of shaft 20 for every line of facsimile signal received. If the helical electrode 18 is not in phase with the received signal, the interpage signal will not be centered on the recording sheet. As shown in Fig. 4, the interpage signal consists of a series of portions 70 representative full-black lines separated by blanks 71. If the helical electrode 18 is not in phase with the interpage signal, an amplified portion 70 of the signal from D.-C. amplifier 13 will be present in time when brush 67 is in contact with segment 68 of rotary switch 17. This results in relay 60 being momentarily energized so that motor 22 is momentarily disconnected from its power source 63. The motor is thus made to slip a pole once per revolution of shaft 20 until brush 67 always contacts segment 68 of rotary switch 17 during receipt of the blank portion 71 of the interpage signal. The recorder is then in phase with the received facsimile signal so that recordings are properly centered on the page.

The foregoing all takes place during receipt of the interpage signal and within about ten seconds after the interpage signal is first received. When the interpage signal is discontinued, thyratron 31 is rendered nonconducting and coil 36 of relay 40 is deenergized. Armature 41 of the relay is then urged by spring 54 (Fig. 1) or spring contact 44 (Fig. 3) in the direction of knurled shaft 51 so that wheel 50 bears thereon. Contacts 44, 45 are broken so that bursts of noise occurring between lines of facsimile signal cannot cause unwanted operation of the phasing circuit.

Since the mechanical parts of the recorder are in operation, knurled shaft 51 is rotating at a low rate and is slowly rotating wheel 50 in the direction of the arrow. After any desired period of time determined by the gear and wheel ratios, the wheel 50 is rotated to the point where notch 57 subtends knurled shaft 51. Spring 54 (Fig. 1) or spring contact 44 (Fig. 3) then can urge contact 44 into engagement with contact 46. This allows current to flow from source 65 through the operating coil 64 of relay 60 which then interrupts the power to motor 22 stopping all rotating parts of the recorder.

When the next interpage signal is received, the recorder is again started and phased in the manner described. If an interpage signal is received before notch 57 on wheel 50 reaches knurled shaft 51, relay 40 is energized and spiral spring 55 returns wheel 50 to its reset position determined by stop pin 56. The recorder thus continues to operate in phase and without interruption. The recorder automatically starts upon receipt of an interpage signal and continues to run for a predetermined period of time following receipt of the last received interpage signal.

It will be understood the facsimile receiver cannot distinguish the interpage signal from the signal resulting from the scanning of graphic copy including a solid black portion extending across the page. The operation of the apparatus of this invention is not in any way adversely affected by these latter signals. The regularly-occurring interpage signals insure the functioning of the apparatus in the desired manner.

Figure 5:
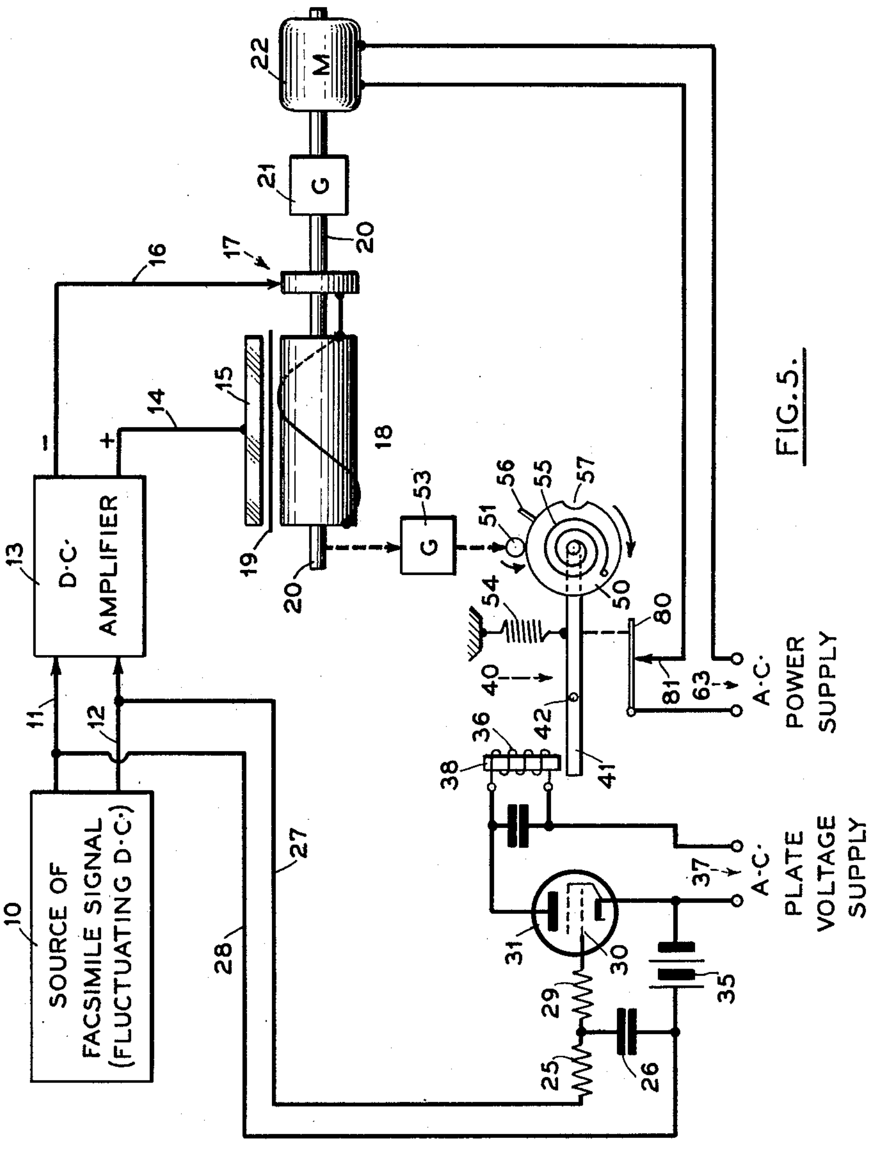
Fig. 5 is a schematic diagram of a second form of the invention.

Fig. 5 shows a second form of the invention which differs from that shown in Fig. 1 in that there is no provision for automatic framing and in that resettable relay 40 has a pair of contacts 80, 81 directly in circuit with the A.-C. power supply 63 for the motor 22.

The operation will now be described assuming an initial condition wherein notch 57 of wheel 50 subtends knurled shaft 51, contacts 80, 81 are open and motor 22 is off. When an interpage signal is received, relay 40 is energized causing contacts 80, 81 to be closed thus starting the motor, and causing wheel 50 to be removed from knurled shaft 51. Spiral spring 55 then turns wheel 50 until stop pin 56 engages knurled shaft 51. When the interpage signal is discontinued, spring 54 urges wheel 50 against knurled shaft 51 which is now rotating. Contacts 80, 81 remain closed. Knurled shaft 51 rotates wheel 50 until notch 57 subtends the shaft, at which time spring 54 moves the armature 40 opening contacts 80, 81. Motor 22 is then stopped and remains stopped until another interpage signal is received.

While the invention has been described in some detail by reference to specific circuits shown, it will be understood that this has been done by way of illustration, and not by way of limitation on the scope of the invention.

What is claimed is:

1. An automatic starting and delayed stopping device for a motor responsive to received signals, comprising: a relay energizable during receipt of said signals, said relay including a solenoid and armature, said armature being movable to at least three distinct positions, means biasing the armature to one position, said solenoid being operative to move the armature against its bias to another position, a resettable rotationally biased notched wheel rotatably mounted on the armature, rotatable means driven by said motor effective to move the armature to a third position, said biasing means tending to urge the wheel against the rotatable means in said one position, and a motor control circuit including contacts operated by the armature, said motor being started on receipt of said signals, and stopped a predetermined time after cessation of said signals, when the notch in the wheel subtends the said rotatable means to dispose the armature in said third position.

2. An automatic starting and delayed stopping device for a motor responsive to received signals, comprising: a relay energizable during receipt of said signals, said relay including a solenoid and armature, said armature being movable to at least three distinct positions, means biasing the armature to one position, said solenoid being operative to move the armature against its bias to another position, a resettable rotationally biased contoured wheel rotatably mounted on the armature, rotatable means driven by said motor effective to move the armature to a third position, said biasing means tending to urge the wheel against the rotatable means in said one position, and a motor control circuit including contacts operated by the armature, said motor being started on receipt of said signals, and stopped a predetermined time after cessation of said signals when the said rotatable means disposes the armature in said third position.

3. In a facsimile recorder receptive to certain facsimile signals, an automatic starting and delayed stopping apparatus for a driving motor comprising: a circuit including a relay energizable during receipt of said signals, said relay including a solenoid and armature, said armature being movable to at least three distinct positions, means biasing the armature to one position, said solenoid being operative to move the armature against its bias to another position, a resettable rotationally biased notched wheel rotatably mounted on the armature, rotatable means driven by said motor effective to move the armature to a third position, said biasing means tending to urge the wheel against the rotatable means in said one position, and a motor control circuit including contacts operated by the armature, said motor being started on receipt of said signals, and stopped a predetermined time after cessation of said signals, when the notch in the wheel subtends the said rotatable means to dispose the armature in said third position.

4. In a facsimile recorder receptive to certain facsimile signals, an automatic starting and delayed stopping apparatus for a driving motor comprising: a circuit including a relay energizable during receipt of said signals, said relay including a solenoid and armature, said armature being movable to at least three distinct positions, means biasing the armature to one position, said solenoid being operative to move the armature against its bias to another position, a resettable rotationally biased contoured wheel rotatably mounted on the armature, rotatable means driven by said motor effective to move the armature to a third position, said biasing means tending to urge the wheel against the rotatable means in said one position, and a motor control circuit including contacts operated by the armature, said motor being started on receipt of said signals and stopped a predetermined time after cessation of said signals when the said rotatable means disposes the armature in said third position.

5. In a facsimile apparatus, means responsive to certain received facsimile signals for automatic starting, phasing, and delayed stopping of a driving motor, comprising: a circuit including a relay energizable during receipt of said signals, said relay including a solenoid and armature, said armature being movable to at least three distinct positions, means biasing the armature to one position, said solenoid being operative to move the armature against its bias to another position, means driven by said motor to move the armature to a third position, a motor control circuit including contacts operated by said armature, and a phasing means including in circuit contacts operated by the armature, a rotary switch driven by said motor, and a relay operatively connected to the motor control circuit, said phasing means being operative to actuate momentarily said motor control circuit, whereby the motor is started on receipt of said signals, phased during receipt of said signals, and run for a predetermined time after cessation of said signals.

6. In a facsimile apparatus, means responsive to certain received facsimile signals for starting, phasing and delayed stopping of a driving motor, comprising: a circuit including a relay energizable during receipt of said signals, said relay including a solenoid and armature, said armature being movable to at least three distinct positions, means biasing the armature to one position, said solenoid being operative to move the armature against its bias to another position, a resettable rotationally biased notched wheel rotatably mounted on the armature, rotatable means driven by said motor effective to move the armature to a third position, said biasing means tending to urge the wheel against the rotatable means in said one position, a motor control circuit including contacts operated by the armature, and a phasing means including in circuit contacts operated by the armature, a rotary switch driven by said motor and a relay operatively connected to the motor control circuit, said phasing means being operative to actuate momentarily said motor control circuit, whereby the motor is started on receipt of said signals, phased during receipt of said signals, and stopped a predetermined time after cessation of said signals, when the notch in the wheel subtends the rotatable means to dispose the armature in said third position.

7. In a facsimile apparatus, means responsive to certain received facsimile signals for starting, phasing and delayed stopping of a driving motor, comprising: a circuit including a relay energizable during receipt of said signals, said relay including a solenoid and armature, said armature being movable to at least three distinct positions, means biasing the armature to one position, said solenoid being operative to move the armature against its bias to another position, a resettable rotationally biased contoured wheel rotatably mounted on the armature, rotatable means driven by said motor effective to move the armature to a third position, said biasing means tending to urge the wheel against the rotatable means in said one position, a motor control circuit including contacts operated by the armature, and a phasing means including in circuit contacts operated by the armature, a rotary switch driven by said motor and a relay operatively connected to the motor control circuit, said phasing means being operative to actuate momentarily said motor control circuit, whereby the motor is started on receipt of said signals, phased during receipt of said signals, and stopped a predetermined time after cessation of said signals when the rotatable means disposes the armature in said third position.

References Cited in the file of this patent

UNITED STATES PATENTS

| | | |
|---|---|---|
| 876,882 | Joy | Jan. 14, 1908 |
| 1,688,711 | Hewitt | Oct. 23, 1928 |
| 2,404,566 | Cooley | July 28, 1946 |
| 2,431,643 | Kahn | Nov. 25, 1947 |
| 2,500,956 | Mershon | Mar. 21, 1950 |
| 2,512,647 | Hester | June 27, 1950 |
| 2,573,041 | May | Oct. 30, 1951 |
| 2,630,494 | Smith | Mar. 3, 1953 |